(12) United States Patent
Park et al.

(10) Patent No.: US 8,553,349 B2
(45) Date of Patent: Oct. 8, 2013

(54) SERVO ROUTINE FOR TRACK SEEKING IN A HARD DISK DRIVE AND HARD DISK DRIVE FOR PERFORMING THE SAME

(75) Inventors: Sung Won Park, Seoul (KR); Soo Il Choi, Yongin-si (KR); Joo-Young Lee, Suwon-si (KR)

(73) Assignee: Seagate Technology, Cupertino, CA (US)

( * ) Notice: Subject to any disclaimer, the term of this patent is extended or adjusted under 35 U.S.C. 154(b) by 362 days.

(21) Appl. No.: 13/018,458

(22) Filed: Feb. 1, 2011

(65) Prior Publication Data

US 2011/0188144 A1    Aug. 4, 2011

(30) Foreign Application Priority Data

Feb. 3, 2010    (KR) .................. 10-2010-0009799

(51) Int. Cl.
*G11B 21/02*    (2006.01)
*G11B 5/58*    (2006.01)
*G11B 5/596*    (2006.01)

(52) U.S. Cl.
USPC .................. 360/75; 360/77.01; 360/78.04

(58) Field of Classification Search
None
See application file for complete search history.

(56) References Cited

U.S. PATENT DOCUMENTS 4,979,055 A * 12/1990 Squires et al. .................. 360/69
5,598,304 A *  1/1997 Choi et al. .................. 360/78.04
6,980,381 B2 * 12/2005 Gray et al. ...................... 360/31
7,042,664 B2 *  5/2006 Gill et al. ........................ 360/31

* cited by examiner

*Primary Examiner* — K. Wong
(74) *Attorney, Agent, or Firm* — Braden Katterheinrich (57) ABSTRACT

A method for controlling a hard disk drive, includes a track seeking servo routine in which seek time is measured in a mode of the routine after the trajectory mode, the measured seek time is compared with a predetermined period of time, and an alarm mode is induced when the measured seek time exceeds the predetermined period of seek time.

13 Claims, 8 Drawing Sheets

SERVO ROUTINE FOR TRACK SEEKING IN A HARD DISK DRIVE AND HARD DISK DRIVE FOR PERFORMING THE SAME

PRIORITY STATEMENT

This application claims the benefit of Korean Patent Application No. 10-2010-0009799, filed on Feb. 3, 2010, in the Korean Intellectual Property Office.

BACKGROUND

The inventive concept relates to a servo routine for track seeking in a hard disk drive (HDD) and to a hard disk drive configured to perform such a track seeking servo routine.

HDDs are data storage devices of computer systems or the like, used to reproduce data recorded on a disk or record user data on the disk using a magnetic head. There are continuous demands for HDDs which have higher data storage capacity and yet are smaller and more compact. To meet these demands, the density at which data can be stored/recorded on the disk is constantly being increased in both the direction of rotation of the disk (as measured in bits per inch (BPI)) and in the radial direction of the disk (as measured tracks per inch (TPI)). Accordingly, a highly accurate mechanism for accessing the disk is required. That is, the performance of the HDD must be increased if a disk having a high data density is to be employed. One of the characteristics of an HDD, which is a barometer of its performance, is seek time. Seek time refers to the time from the issuance of a seek command to the time a magnetic head is moved (from a current cylinder) to a target cylinder (a location within an acceptable distance from a track where the magnetic head is to read or record information from or onto the disk). The routine for moving the magnetic head in this case is referred to as a track seeking routine, and may be referred to hereinafter merely as track seeking.

Figure 1:
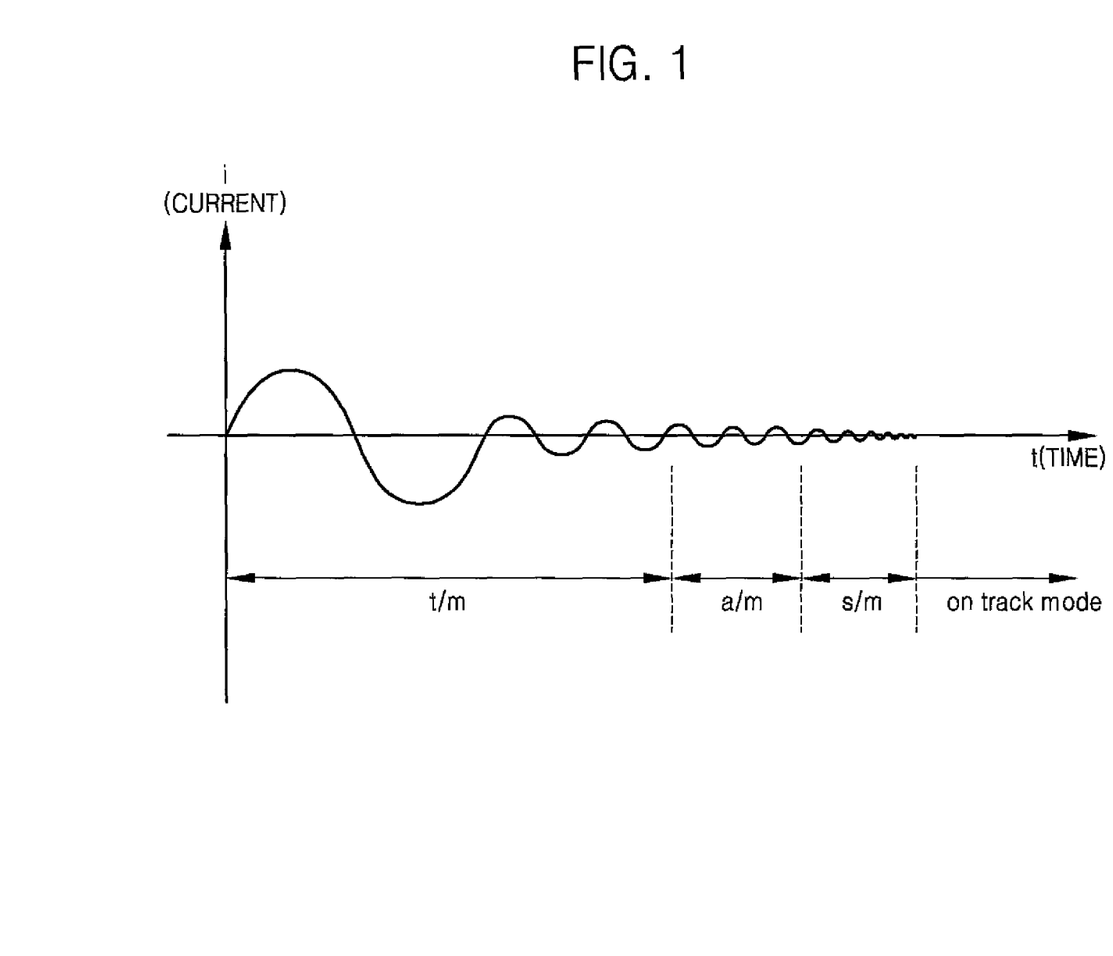
FIG. 1 is a graph showing a model of a track seeking servo routine.

The HDD includes an actuator arm supporting the magnetic head, and a voice coil motor (VCM) that moves the actuator arm to position the magnetic head with respect to the disk. A seek current is supplied to the VCM, in a servo control, to effect track seeking. A simplified model of a track seeking servo routine is shown FIG. 1. In FIG. 1, the X axis represents seek time and the Y axis represents the seek current used to operate the VCM during track seeking.

Referring now to FIG. 1, the servo routine for track seeking generally includes two modes: a trajectory mode (t/m) using a feedforward control and a linear mode using feedback control. With respect to the feedback control, the acceleration, velocity, and trajectory (positions) of the magnetic head are designed for. Errors between the design velocity and the actual velocity and between the design trajectory and the actual position trajectory are provided as feedback with respect to seek current.

Also, the linear mode may be divided into an arrive mode (a/m) and a settle mode (s/m) differentiated based on the gain of the signal issued by the controller during the linear mode. The amplitude of the current used to operate the VCM varies the most during the trajectory mode (t/m). The waveform of the seek current is gradually stabilized in the arrive mode (a/m) and the settle mode (s/m). After the waveform of the current is stabilized, the servo control enters an on-track mode under which the magnetic head is allowed to read or write information with respect to a disk. As mentioned above, the trajectory mode (t/m) is the product of a feedforward control. Therefore, the cycles of the trajectory mode may be modeled as pure sine waves. Also, the frequency of the current increases in the arrive mode (a/m), i.e., the seek current in the arrive mode (a/m) has a higher frequency compared to the seek current in the trajectory mode (t/m).

Furthermore, a servo system of an HDD is typically provided with an alarm mode by which the servo control of the HDD can be restored to a normal state. That is, when an abnormal state is detected, e.g., when an external shock causes the HDD to operate abnormally, the servo system of the HDD enters an alarm mode so that various control variables are reset and the HDD is restored to a normal state.

The servo system enters the alarm mode when any of three operating states are detected. The first is a case in which the system fails to detect a servo address mark (SAM) after a certain time. The second is a case in which the value of an error signal generated by a state detector is greater than a reference value. The third is a case in which a measured period of seek time is longer than a predetermined period of seek time. When the servo system enters the alarm mode, the HDD is controlled to try to establish a floating mode (a state in which the magnetic head floats on air above the surface of the disk as spaced from the disk by a distance within a predetermined range). If after two or three times the HDD does not attain the floating mode, the servo system controls the HDD to enter a parking mode in which the magnetic head is parked off of the recording surface of the disk.

An external shock applied to an HDD may induce vibrations in the HSA of the HDD within the range of the natural frequency of the HSA. That is, the head stack assembly may resonate for some time after an external shock has been applied to the HDD. In a conventional servo routine for track seeking, the seek time during the trajectory mode (t/m) (refer to FIG. 1) is measured and this time is compared to a predetermined period of time. In the case in which the HSA of a conventional HDD is vibrating during track seeking, as the result of an external shock, the HDD may not enter the alarm mode and instead, a timeout error is generated. That is, the conventional track seeking servo routine is ineffective in detecting an external shock, which adversely affects the performance of the HDD.

SUMMARY

A hard disk drive has a disk has servo information recorded thereon, a magnetic head for reading/writing information from/onto the disk, an actuator arm to which the magnetic head is mounted, a voice coil motor including a voice coil integrated with the actuator arm, and a controller having a servo system configured with a track seeking servo routine in the form of a model of current supplied to the voice coil over seek time. The track seeking routine includes an on track mode in which the magnetic head is allowed to read/write information from/onto the disk, a trajectory mode in which current is supplied to the voice coil using a feedforward control, at least one mode that follows the trajectory mode and precedes the on-track mode and in which current is supplied to the voice coil using a feedback control.

According to one aspect of the inventive concept, there is provided a method for use in the hard disk drive, including measuring seek time during at least one mode of the track seeking servo seek routine that follows the trajectory mode, comparing the measured seek time with a predetermined period of seek time, inducing the servo system to enter an alarm mode when the measured seek time exceeds the predetermined period of seek time, and controlling the magnetic head to read/write information from/onto the disk during the on-track mode.

According to one aspect of the inventive concept, there is provided a method for use in the hard disk drive, including applying external shocks to the hard disk drive while forcibly and repetitively applying a signal which causes the magnetic head to move a distance of zero in a track seeking routine in which the magnetic head is controlled to seek a track, obtaining an error pattern from position error signals generated as feedback during times the signal which causes the magnetic head to move a distance of zero is applied, storing the error pattern as a table of the position error signals, acquiring an error pattern from a position error signal each of a plurality of unit periods of time during the mode(s) of the seek routine that follow(s) the trajectory mode, analyzing the acquired error patterns using the table, inducing the servo system to enter an alarm mode when the analyzing of the acquired error patterns yields a predetermined result, and controlling the magnetic head to read/write information from/onto the disk during the on-track mode.

According to another aspect of the inventive concept, the controller of the hard disk drive is configured to measure seek time during at least one mode of the seek routine that follows the trajectory mode during the track seeking servo routine, compare the measured seek time with a predetermined period of seek time, induce the servo system to enter an alarm mode when the measured seek time exceeds the predetermined period of seek time, and control the magnetic head to read/write information from/onto the disk during the on-track mode.

According to another aspect of the inventive concept, the hard disk drive further includes an electronic data table of position error signals, and the controller is configured to acquire an error pattern from a position error signal each of a plurality of unit periods of time during each mode of the seek routine that follows the trajectory mode, analyze the acquired error patterns using the table, induce the servo system to enter an alarm mode when the analyzing of the acquired error patterns yields a predetermined result, and control the magnetic head to read/write information from/onto the disk during the on-track mode.

BRIEF DESCRIPTION OF THE DRAWINGS

The inventive concept will be more clearly understood from the following detailed description of preferred embodiments thereof made in conjunction with the accompanying drawings in which.

DETAILED DESCRIPTION OF THE PREFERRED EMBODIMENTS

The inventive concept will now be described in detail with reference to the FIGS. 2-8. Like reference numerals denote like elements throughout the drawings.

Figure 2:
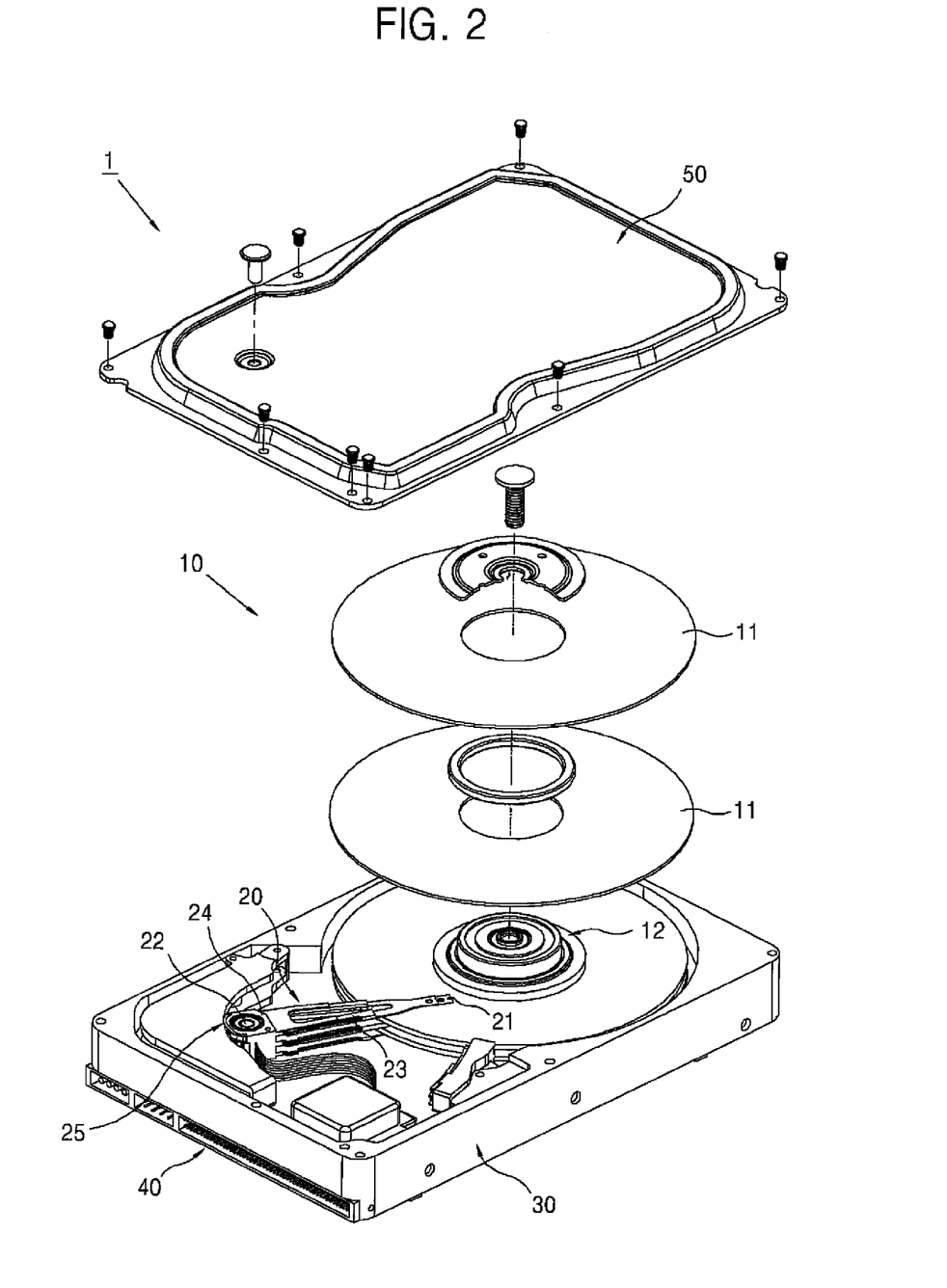
FIG. 2 is an exploded perspective view of an HDD for carrying out a track seeking servo routine, according to the inventive concept.

Referring first to FIG. 2, an HDD 1 according to the inventive concept includes a disk pack 10 having a disk 11 for storing data and a spindle motor 12 for supporting and rotating the disk 11, a head stack assembly (HSA) 20 for recording data on and reading out data from the disk 11, a base 30 on which the above constituent elements are assembled, a printed circuit board assembly (PCBA) 40 coupled to a lower portion of the base 30 and including a printed circuit board (PCB) having circuit parts for controlling the spindle motor 12 and HSA 20, and a cover 50 covering an upper portion of the base 30.

The HSA 20, which may also be referred to as an actuator, includes a magnetic head 21 for writing data onto or reading data from the disk 11, an actuator arm 23 supporting the magnetic head 21, a pivot shaft holder 24 to which the actuator arm 23 is coupled, a bobbin (not shown) extending from the pivot shaft holder 24 in the opposite direction from the actuator arm 23 and interposed between magnets of a voice coil motor (VCM) 25, and a voice coil wound on the bobbin so as to also be located between the magnets of the VCM 25. The pivot shaft holder 24 is rotatably supported by a pivot shaft 22, mounted to the base 30, such that the actuator arm 23 is rotatable about an axis of the pivot shaft 22. Rotating the actuator arm 23 moves the head 21 across the disk 11 so that the head 21 accesses the disk 11 for reading data from or writing data onto the disk 11. In this respect, the magnetic head 21 reads or writes data by detecting a magnetic field emanating from a surface of the disk 11 or magnetizing the surface of the disk 11. To this end, the magnetic head 21 includes a read head for reading data and a write head for writing data.

The VCM 25 rotates the actuator arm 23 about the axis of the pivot shaft 22 to move the magnetic head 21 to a desired position on the disk 11. More specifically, a force is applied to the bobbin by applying current to the voice coil interposed between the magnets because, as is well known, an electromotive force is generated on a conductor (in this case the voice coil) situated in a magnetic field when current flows through the conductor. The force acts on the conductor in a direction according to Fleming's left hand rule. Thus, the VCM 25 rotates the bobbin about the axis of the pivot shaft 22 in a direction depending on the direction in which current is supplied to the voice coil. As a result, the actuator arm 23 extending from the pivot shaft holder 24 rotates in a direction opposite to the direction of rotation of the bobbin, to move the head 21 supported at an end of the actuator arm 23 to a position over the disk 11. The head 21 thus accesses a track of the disk 11 that is rotating. If a read operation is being carried out, for example, the head 21 detects information from the track and outputs corresponding information in the form of signals, i.e., the information is signal processed.

The PCBA 40 includes a controller 42 (refer to FIG. 6) for controlling various components of the HDD, and an at least one memory (not shown) for storing an error pattern table. The controller 42 is configured to execute a servo control for track seeking according to the inventive concept, as will be described in more detail below.

Figure 3:
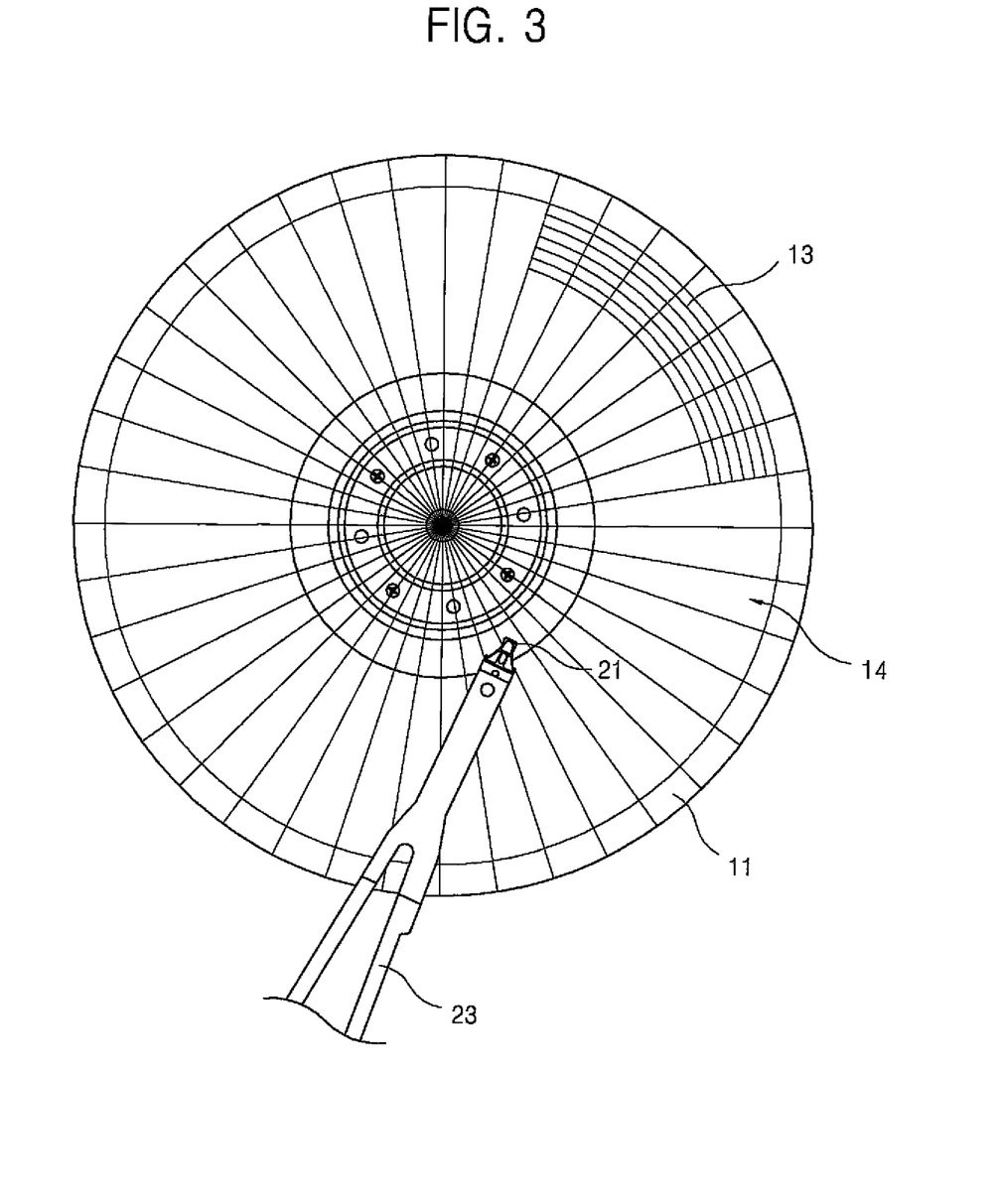
FIG. 3 is a schematic plan view of a disk of the HDD.
Figure 4:
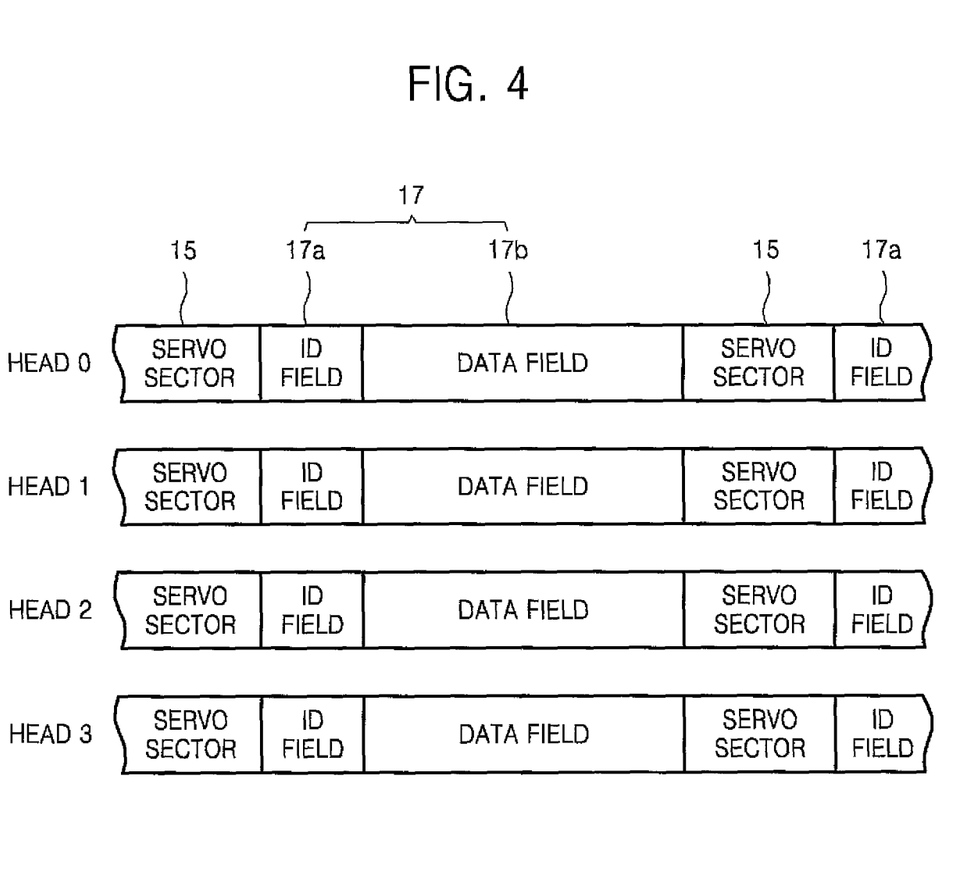
FIG. 4 is a conceptual diagram of a data format of track of recording surfaces of disks of the HDD.
Figure 5:
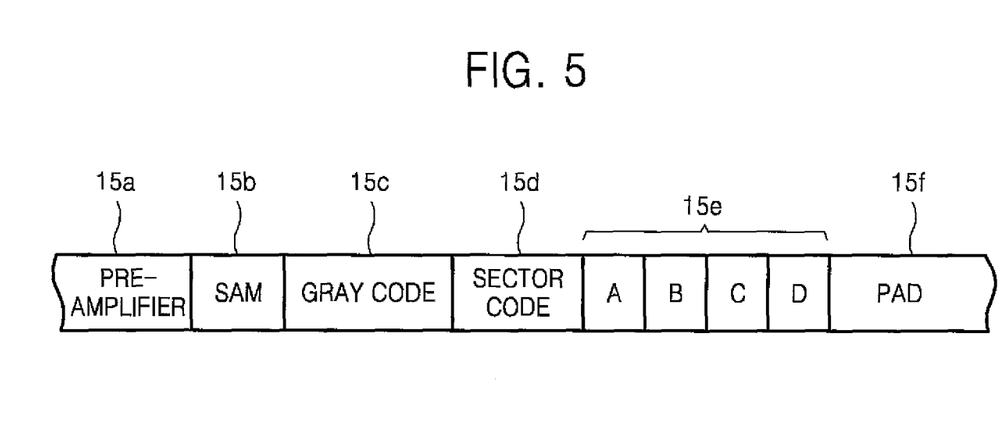
FIG. 5 is a conceptual diagram of the format of a servo sector of each track.

As illustrated in FIG. 3, the disk 11 of the HDD includes a plurality of tracks 13 and each track 13 has a plurality of sectors 14 obtained by dividing the track 13 at equal angular intervals with respect to the center of rotation of the disk 11. Each sector of a track 13, as illustrated in FIG. 4, includes a servo sector 15 which stores servo information for allowing the magnetic head to find a track (track seeking) or follow a track (track following) and a data sector 17 in which user data is stored/recorded. The servo sectors 15 and data sectors 17 are alternately arranged along the length of the track 13. Each servo sector 15, as illustrated in FIG. 5, includes a preamble 15a. a servo address mark (SAM) 15b. a gray code 15c. a sector code 15d, bursts (also known as servo bits) A, B, C, and D 15e. and a PAD 15f. The preamble 15a provides clock sync during the reading of servo information and at the same time provides a gap to indicate that the head 21 is over a servo sector, which operation is referred to as servo sync. The SAM 15b provides sync to read the gray code 15c following the indication of the start of a servo sync. That is, the SAM 15b is provided as a reference point for generating various timing pulses related to servo control. The gray code 15c provides information about each of the tracks 13, that is, track information. The sector code 15d provides the number (identification) of the sector. The bursts A, B, C, and D 15e provide a position error signal (PES) required for the track seek and track following. Finally, the PAD 15f provides a margin for the transition from the servo sector 15 to the data sector 17.

Each data sector 17 includes an ID field 17a and a data field 17b. Header information for identifying the data sector is recorded in the ID field 17a. Digital data that a user desires to access is recorded in the data field 17b.

Figure 6:
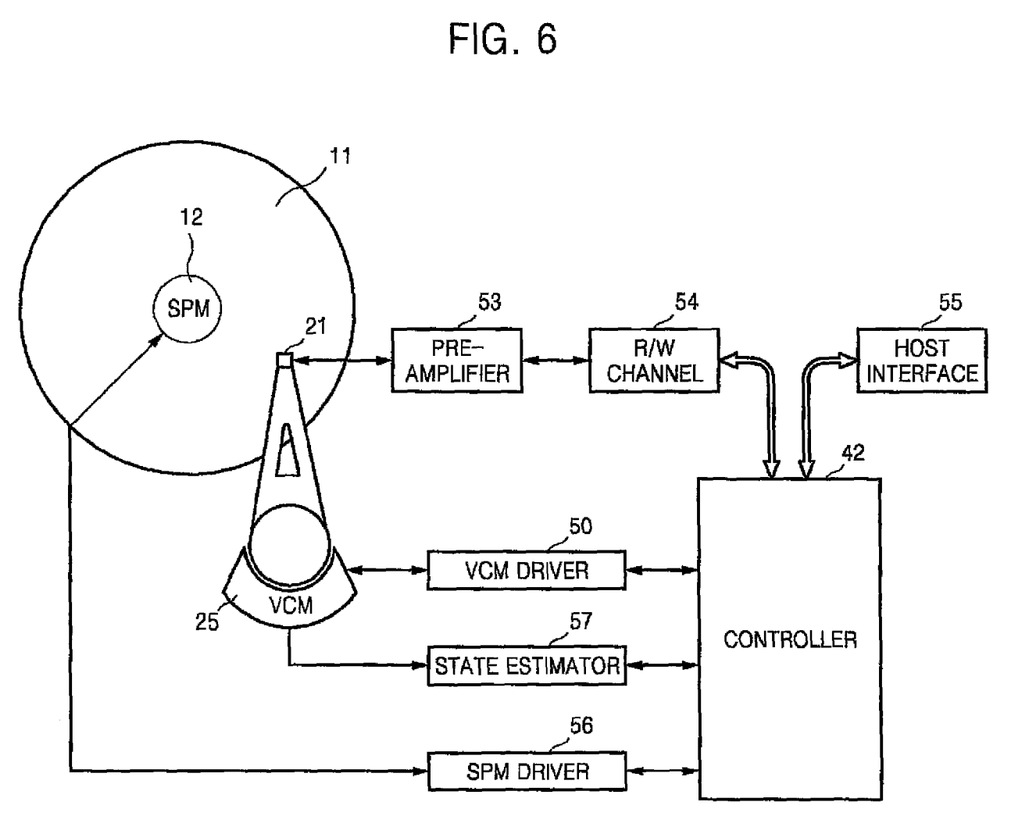
FIG. 6 is a block diagram of an embodiment of an HDD for carrying out a track seeking servo routine, according to the inventive concept.

Referring now to FIG. 6, the HDD also includes a preamplifier 53, a read/write (R/W) channel 54, a host interface 55, a VCM driver 50, an SPM driver 56, a state estimator 57, and a controller 42 for controlling the constituent elements.

The preamplifier 53 amplifies a data signal produced by the head 21 upon reading data from the disk 11 or a write current converted by the R/W channel 54. Thus, an amplified data signal or amplified write current is read from or recorded on the disk 11 using the head 21.

During a read operation, i.e., in a data detection mode, the R/W channel 54 converts the signal amplified by the preamplifier 53 into a digital signal and transmits the digital signal to a host apparatus (not shown) through the host interface 55. Furthermore, during a write operation, i.e., in a data write mode, the R/W channel 54 receives user data input through the host interface 55, converts the user data into a binary data stream that is easy to record, and inputs the binary data stream to the preamplifier 53.

The host interface 55 transmits data that is converted into a digital signal to the host apparatus, or receives the user data from the host apparatus and inputs the received user data to the R/W channel 54 through the controller 42.

The VCM driver 50 receives a control signal of the controller 42, and based on the control signal adjusts the current supplied to the voice coil of the VCM 25. The SPM driver 56 receives a control signal of the controller 42, and based on that control signal adjusts the amount of current supplied to the SPM 12.

In the data write mode, the controller 42 receives data input by a user through the host apparatus via the host interface 55 and outputs received user data to the R/W channel 54. On the other hand, in the data detection mode, the controller 42 receives a read signal converted by the R/W channel 54 into a digital signal and outputs the digital signal to the host interface 55. Also, as is clear from the description above, the controller 42 controls the outputs of the VCM driver 50 and the SPM driver 56.

The state estimator 57 uses a program, known per se, to estimate various states of the magnetic head 21, including the position and speed of the magnetic head 21, based on the bursts A, B, C, D. That is, the state estimator generates the aforementioned position error signal (PES).

A servo control method for track seeking according to the inventive concept will now be described in detail.

As described above with reference to FIG. 1, a track seeking servo routine includes a trajectory mode (t/m), and at least one subsequent mode, namely, an arrive mode (a/m) and a settle mode (s/m). Also, the servo routine enters the on-track mode once the magnetic head 21 settles, i.e., is stable, at the target track whereupon the magnetic head 21 can begin a read/write operation.

Figure 7:
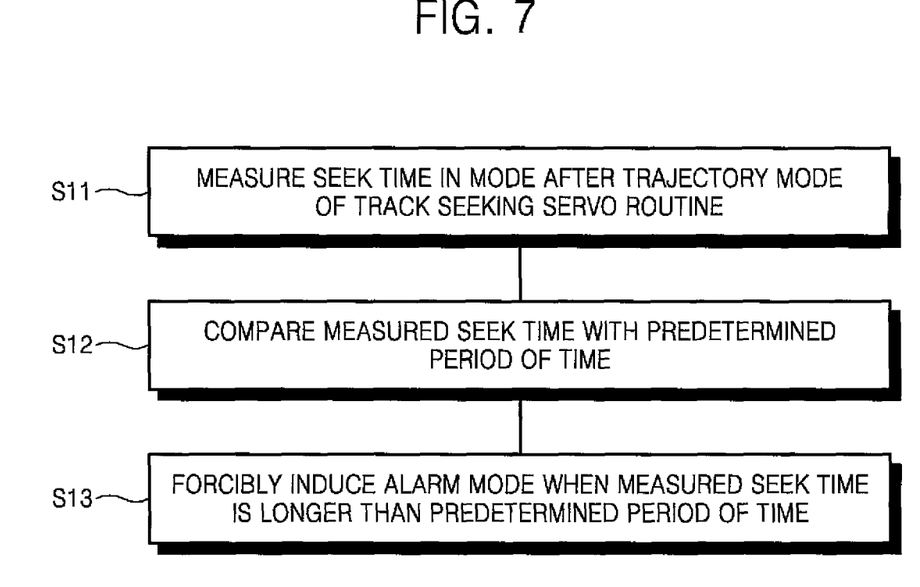
FIG. 7 is a flowchart of an embodiment of a track seeking servo routine in an HDD according to the inventive concept.

Referring to FIGS. 1, 6 and 7, during the track seeking servo routine, the controller 42 measures the seek time in a mode after the trajectory mode (t/m) of the routine and then compares that time with a predetermined period of time. The controller 42 controls the servo system to forcibly enter an alarm mode when the time measured in a mode after the trajectory mode (t/m) is longer than a time period predetermined by the trajectory generator.

Thus, the controller 42 may measure time during only one of the arrive mode (a/m) and the settle mode (s/m), i.e., during a mode after the trajectory mode (t/m), and then compare that measured time with the predetermined period of time. However, when the head stack assembly 20 resonates due to an external shock applied to the HDD 1, the servo routine may repeatedly switch between the arrive mode (a/m) and the settle mode (s/m) due to a certain mode of vibrations.

Thus, in another embodiment of the inventive concept, the controller 42 controls the servo system to forcibly enter the alarm mode when the total time between the start of the arrive mode (a/m) and the start of the on track mode, i.e., the sum of the times of each arrive mode (a/m) and each settle mode (s/m) during a track seeking routine, is longer than a time period predetermined by the trajectory generator.

Such a track seeking servo routine as performed by the HDD 1, according to the inventive concept, will be described below.

When power is applied to the HDD 1, the disk 11 starts to rotate. As the disk 11 rotates, a lift force is exerted on a slider (not shown) to which the magnetic head 21 is mounted due to the current of air that is produced between the rotating disk 11 and the slider. This lift force is countered by an elastic force exerted on the slider by a suspension (not shown) coupled to the actuator arm. Accordingly, once the lift force and the elastic force are balanced, the slider and hence, the magnetic head, are maintained in a state in which the head floats over the disk 11 as spaced a predetermined distance (height) therefrom. Track seeking and read/write operations are performed while the magnetic head is in such a floating state, i.e., while the so-called floating mode is in effect.

The controller 42 performs the following method during track seeking, especially when an external shock has been applied to the HDD 1.

First, seek time is measured during all modes of the track seeking servo routine subsequent to the trajectory mode (t/m) (S11), e.g., during the arrive mode (a/m) and the settle mode (s/m). Then, the measured seek time is compared with a predetermined period of seek time (S12). When the sum of the seek time measured during the arrive mode (a/m) and the seek time measured during the settle mode (s/m) is longer than a period of seek time predetermined by the trajectory generator, the controller 42 causes the servo system to forcibly enter the alarm mode (S13).

When the alarm mode is forcibly entered into, the controller 42 tries two or three times to establish a floating state of the magnetic head by placing the servo system in a floating mode. When these attempts fail, the controller 42 places the servo system in a parking mode which causes the magnetic head to be parked off of the recording surface of the disk. Because the controller 42 forcibly induces the alarm mode when the sum of the seek time in the arrive mode (a/m) and the settle mode (s/m) is longer that a period of time predetermined by the trajectory generator, external shock is in effect more effectively detected than when employing a conventional technique in which the time during the trajectory mode is used. That is, the necessity to enter the alarm mode may be more quickly induced according to the inventive concept.

As was mentioned above in connection with the conventional track seeking servo routine, a control input during the initiation of the routine is saturated when the HSA is experiencing a particular mode of vibrations due to an external shock. In this case, a particular pattern of the modes of the servo routine is generated.

The vibrations which cause modes of the track seeking servo routine to repeat may be in effect detected by adopting an embodiment of the following track seeking servo routine according to the inventive concept, described with reference to FIG. 8.

During the manufacturing of the HDD 1, varying levels of external shock are applied to the HDD 1 in a state in which seeking distance zero is forcibly repeated so that an error pattern (a pattern of the respective resulting position error signals) are obtained by the trajectory generator, respectively, and a table of the error pattern (i.e., a table of the position error signals) is produced. The error pattern table may be stored (S21) in the memory of the controller 42 (as provided on the PCBA 40). Alternatively, the error pattern table may be stored in a maintenance area of the disk 11.

Figure 8:
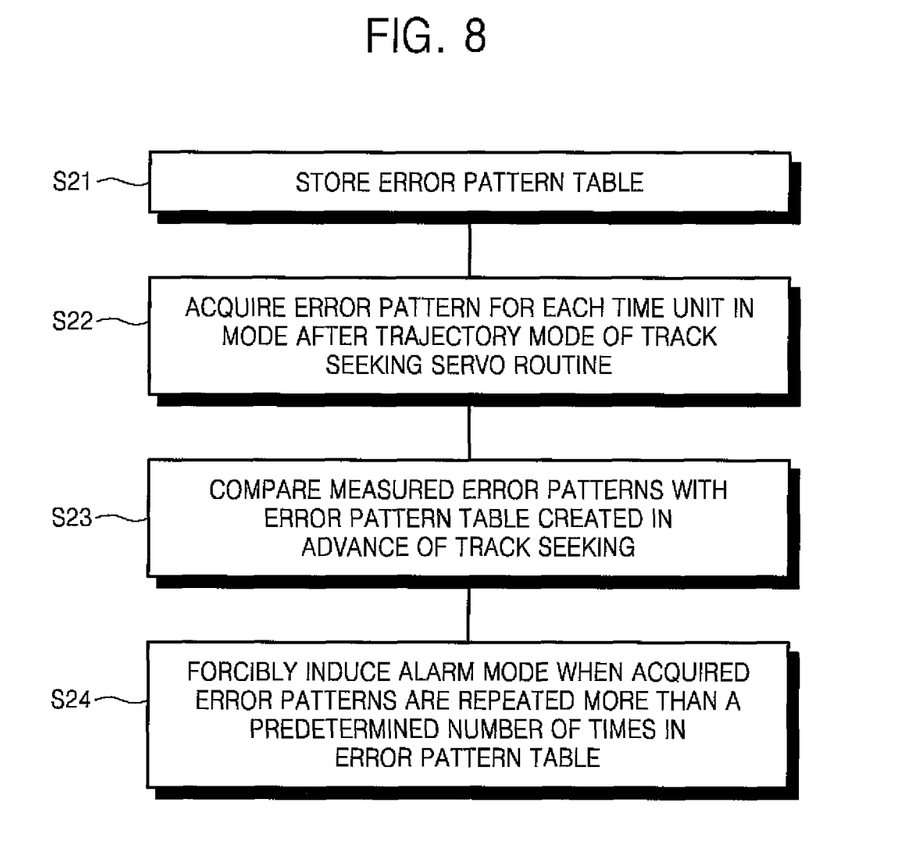
FIG. 8 is a flowchart of a method for use in track seeking in an HDD, according to the inventive concept.

When the operation S21 is performed in advance, the controller 42 of the present embodiment controls the operations in the sequence shown in FIG. 8. During track seeking, an error pattern is measured for each unit time in a mode after the trajectory mode (t/m) of the track seeking servo routine (S22). As described above, the modes after the trajectory mode (t/m) include each arrive mode (a/m) and each settle mode (s/m), and the on-track mode.

Next, the measured error patterns are analyzed using the stored error pattern table (S23). When the error pattern measured in the mode after the trajectory mode (t/m) is found a predetermined number of times on the error pattern table, this indicates that the HSA 20 is still vibrating (residual vibrations exist). As a result of this determination, the controller 42 forcibly induces the servo control to enter the alarm mode (S24).

In the alarm mode, as described above, the controller 42 tries to establish the floating mode two or three times. If this fails, the HDD1 is controlled to induce the parking mode.

As described above, according to the present inventive concept, external shock is effectively detected and the HDD is controlled to enter the alarm mode quickly even while the HSA is still vibrating after the external shock has been applied. Thus, external shock does not degrade the performance of an HDD according to the inventive concept.

In addition, when the HSA carrying the magnetic head is undergoing a particular mode of vibrations (excitation due to external shock), the vibrations are manifested in the control loop as high frequency noise. In this case, the vibrations are quickly detected by employing the method according to the inventive concept shown in and described with reference to FIG. 8. In some cases, the vibrations may be dealt with so quickly that high frequency noise is prevented in the first place.

Finally, embodiments of the inventive concept have been described above in detail. The inventive concept may, however, be embodied in many different forms and should not be construed as being limited to the embodiments described above. Rather, these embodiments were described so that this disclosure is thorough and complete, and fully conveys the inventive concept to those skilled in the art. Thus, the true spirit and scope of the inventive concept is not limited by the embodiments described above but by the following claims.

What is claimed is:

1. A method for use in a hard disk drive having a track seeking servo routine that includes a trajectory mode utilizing feedforward control; an arrive mode and a settle mode utilizing feedback control; and an on-track mode during which data is read from or written to a recording disk, the method comprising:
   measuring a seek time during the arrive mode and settle mode;
   comparing the measured seek time with a predetermined period of seek time; and
   inducing the hard disk drive to enter an alarm mode when the measured seek time exceeds the predetermined period of seek time.

2. The method of claim 1, wherein the measured seek time is a total seek time during the arrive and settle modes.

3. The method of claim 1, wherein the hard disk drive has a voice coil motor (VCM) that is driven by a VCM current, wherein an amplitude of the VCM current varies less in the arrive and seek modes than the trajectory mode.

4. The method of claim 1, wherein the hard disk drive has a voice coil motor (VCM) that is driven by a VCM current, wherein a frequency of the VCM current in the arrive mode is higher than the trajectory mode.

5. The method of claim 1, wherein when the hard disk drive is induced to enter an alarm mode, the hard disk drive enters a parking mode.

6. A method for use in a hard disk drive having a track seeking servo routine that includes a trajectory mode utilizing feedforward control; an arrive mode and a settle mode utilizing feedback control; and an on-track mode during which data is read from or written to a recording disk, the method comprising:
   applying external shocks to the hard disk drive while applying a command which causes the magnetic head to seek a zero distance
   obtaining an error pattern from position error signals generated as feedback during the applying step;
   storing the error pattern as a table of the position error signals;
   acquiring an error pattern from a position error signal during the arrive and settle modes;
   comparing the stored error pattern with the acquired error patterns; and
   inducing the hard disk drive to enter an alarm mode when the comparison yields a predetermined result.

7. The method of claim 6, wherein the hard disk drive is induced to enter the alarm mode when more than a predetermined number of the acquired error patterns correspond to data in the table.

8. A hard disk drive comprising:
   a disk having servo information recorded thereon; and
   a controller including a servo system configured with a track seeking servo routine that includes a trajectory mode utilizing feedforward control; an arrive mode and a settle mode utilizing feedback control; and an on-track mode during which data is read from or written to the disk,
   wherein the controller is configured to:
     measure a seek time during the arrive mode and settle modes,
     compare the measured seek time with a predetermined period of seek time, and induce the servo system to enter an alarm mode when the measured seek time exceeds the predetermined period of seek timed.

9. The hard disk drive of claim 8, wherein the servo system comprises a trajectory generator that produces the predetermined period of seek time.

10. A hard disk drive comprising:
a disk having servo information recorded thereon; and
a controller including a servo system configured with a track seeking servo routine that includes a trajectory mode utilizing feedforward control; an arrive mode and a settle mode utilizing feedback control; and an on-track mode during which data is read from or written to the disk; and
an electronic data table of position error signals,
wherein the controller is configured to:
acquire an error pattern during the arrive and settle modes;
compare the electronic data table with the acquired error patterns; and
induce the servo system to enter an alarm mode when the comparison yields a predetermined result.

11. The hard disk drive of claim 10, wherein the controller is configured to induce the alarm mode when more than a predetermined number of the acquired error patterns correspond to data in the table.

12. The hard disk drive of claim 10, wherein the controller includes a memory in which the electronic data table is stored.

13. The hard disk drive of claim 10, wherein the disk has the electronic data table stored thereon.

* * * * *